United States Patent Office 3,509,950
Patented May 5, 1970

3,509,950
WELL DRILLING MUD AND SCREEN COMPOSITION AND METHOD OF USE THEREOF
Raphael G. Kazmann, 611 College Hill Drive, Baton Rouge, La. 70808, and John A. McEntire III, 5806 Hawthorne Blvd., Little Rock, Ark. 72207
No Drawing. Filed Mar. 27, 1968, Ser. No. 716,330
Int. Cl. E21b 21/04; C10m 3/14
U.S. Cl. 175—65                                7 Claims

ABSTRACT OF THE DISCLOSURE

A screen composition of sand and epoxy resin permeable to water, oil, and other fluids for use in wells. The composition may be used generally as a filter or as a construction material. In the well drilling process a special drilling material of an organic gum and enzyme is employed after drilling with conventional drilling muds. The highly thixotropic organic gum and enzyme material breaks down to a very low viscosity fluid obviating the plugging of the screen with mud, which would be encountered using conventional drilling fluids.

Summary of the invention

By means of this invention, there has been provided a novel screen material for production of water and other liquids in the well drilling field. The screen is simple, easy to manufacture, is of low cost, and is made from readily available sand or other particulates with an epoxy resin binder. The permeability of the screen makes it available for use as a filter or standard material of construction. For use in well drilling, the screen installation requires a special process to prevent plugging of the pores, which would otherwise be occasioned by the use of conventional mud or other drilling media.

The drilling is accomplished by drilling with conventional drilling fluids or muds to the water or liquid producing zone. When the producing zone is reached a highly thixotropic water fluid mix of organic gum, such as guar gum, gum arabic (acacia), mesquite gum or other high molecular weight mono, di, or polysaccharides which form colloids with water, is employed with a destructive enzyme to carry the cuttings from the producing zone. After drilling through the producing zone, the screen of the novel composition of this invention is then placed in the producing zone and by enzyme action the organic gum drilling media is degraded or broken down and destroyed to the point where the viscosity is drastically reduced and approaches the viscosity of the fluid in the producing zone, i.e., water where a water well is being drilled or oil, where an oil well is being drilled. This prevents contamination or plugging of the pores of the screen.

The sand and epoxy resin composition finds a high utility in the well screen of this invention, but can also be used as a filter media in other areas. Additionally, it can be employed as a standard material of construction wherever desired. Because of ready availability of sand, the screen or other types of structure using the composition of the invention can be manufactured in local areas at the drill site and other desired areas in the field without high installation or plant cost.

The above features are objects of this invention and further objects will appear in the detailed description which follows and will otherwise be apparent to those skilled in the art.

The disclosure

The well drilling process of this invention using the novel screen composition finds high advantage in the simplicity of the process and the economy of the well screen, which is easily manufactured in the field, thus producing a more satisfactory and cheaper well than heretofore possible. The process of drilling a well follows the general procedure of drilling the well to the producing formation using any conventional drilling system with any desired type of drilling mud. When the producing formation is reached, the well bore is washed out to remove the conventional mud. The bore hole is then filled with the highly thixotropic viscous material of this invention using the organic gum and water to develop the highly thixotropic mixture. This mixture also contains an enzyme which causes the deterioration or breakdown and degradation of the organic substance after a period of time ranging from a few hours to a few days.

The thixotropic organic gum and enzyme mixture in water is employed as a drilling mud to drill through the producing zone. After the drilling is completed, the screen, in the form of a tubular configuration utilizing the sand and epoxy compoistion of this invention, is lowered with associated casing into the producing zone. After the enzyme acts to destroy or degrade the organic material and thereby reduce the viscosity of the producing formation drilling media, the well is then ready for completion. Thus, the usual installation of the pump follows with pump out of the reduced viscosity drilling media and commencement of the pumping operation from the producing zone.

The screens employed in this invention are permeable to water, oil, or other liquids. However, because of their degree of porosity and fineness of openings, they are not satisfactory alone when used with normal drilling muds due to clogging of the pores. It is virtually impossible to remove the drilling mud from the wall of the well screen by overpumping because the screen is so efficient that there cannot be created the velocity gradients necessary which serve to remove the normal drilling mud.

The well screens employed in this invention are manufactured from a mixture of a conventional epoxy resin, such as the Epon resins supplied by Shell Chemical Company or the Armstrong Company's C-7, or any other acceptable epoxy resin that can be cured at a reasonable temperautre, which may be from 300 degrees to 250 degrees Fahrenheit, or down to room or ambient temperatures depending upon the epoxy material and catalyst chosen. The epoxy resin is mixed with sand of appropriate fineness such as 20 to 100 mesh and placed in a mold and cured. The resulting material is, of course, rigid and is very stable under the pressures and temperatures encountered in well technology. The size of the sand used is determined on the basis of the analysis of samples obtained during the drilling of the exploratory hole. The screens can be made in any diameter and any length as required. Likewise, the sand and epoxy resin composition can be molded in any desired configuration and used as a standard material of construction.

Where permeability is not a desired factor, such as when molding casing pipe in the field, the composition can be made impervious. This can be done where transportation of pipe is a costly construction factor in well development. The impermeability of the sand and epoxy resin composition can be accomplished by increasing the epoxy proportion above four percent, with increase in impermeability being proportioned to the amount of epoxy employed. Generally, for impermeability, the epoxy resin should be employed in the amount of 5% to 40% by weight of the composition. The latter percentage corresponds to complete filling of the void space in the sand aggregate.

The epoxy resin has been found to be particularly desirable for use with sand, since it preferentially wets the sand and it has a high degree of strength and corrosion resistance.

There is listed below an illustrative example that can be employed in the well screen of this invention.

Example

Dry sand is mixed with 4% by weight of Epon resin (including the resin catalyst) in a cement mixer. After mixing, the mix is poured into a mold that has been treated with a conventional mold release such as a paste wax. The composition is then baked in an oven from 250 to 300 degrees Fahrenheit for 2 hours. After the epoxy and sand composition in the mold structure has cooled to room temperature, it may be removed and is ready for use.

It will be understood that reinforcing metal grids or bars, such as steel or bolt bars to attach the screen to any desired casing material, may be incorporated as necessary in the mold before the casting of the screen. It has also been found that the permeability of the molded screen structure may be increased by about 10 to 15 percent by reducing the Epon content from 4 percent to about 3 percent. This is at the sacrifice of a small degree of strength. If greater permeability is desired, the weight of the Epon resin can be reduced to about two percent. At this point it has been found advantageous to dilute the epoxy resin with diesel fuel before mixing it with sand. It will be understood also that the screened size of the sand in a well screen may vary, but it has been generally found that the sand employed may be from screened cuts in the range of twenty to one hundred mesh.

The thixotropic organic drilling fluid composition of this invention that is used in drilling through the producing zone where the screen is to be installed is of a special composition to provide for degradation and accompanying reduction is viscosity. The organic materials that can be employed are those that when mixed with water provide a highly thixotropic, gel type, composition and are of sufficient weight to hold the well open in the well drilling process. Organic materials that have been found desirable in this invention are guar bean, although gum arabic (acacia), mesquite gum, and other similar type high molecular weight complex mono, di, or polysaccharides which form colloids with water may be used. The guar bean contains the enzyme capable of destroying the thixotropic gel. This is also true of gum arabic. It has been found desirable, however, that commercially available enzymes or zymases such as from yeasts be added to expedite the destruction or degradation of the thioxotropic gel to reduce the viscosity. Thus, we have found that Johnson's "Revert" is desirably employed. This is a composition composed of guar bean and an enzyme. When the enzymic action has been fully completed, the viscosity of the "mud" is very close to that of water. As an example, 0.8% by weight "Revert" in water has a Marsh funnel viscosity of 90 seconds, one day after initial mixing. It retains this viscosity for about 3¾ days and then, in just half a day breaks down to a viscosity of 28 seconds, which is close to pure water's value of 25 seconds.

The concentration of, for example, guar bean that is employed must be such that the weight of the thixotropic mixture plus the well bore cuttings will hold the well open. As an example, a guar beans concentration of about two percent by weight in water will give a mixture that has been found to be useful and is of such high viscosity that it is almost incapable of being poured from an open bucket.

By means of this invention there has been provided a screen or filter made from the composition disclosed herein that can be produced in the field to provide a strong and corrosion resistant structure. The compressive strength of the screen, as an example, may be in the order of from five to eight thousand p.s.i. with a tensile strength of five hundred to two thousand p.s.i. Other particulates besides sand may be employed such as vermiculite and the like, but sand has been found desirable because it is readily available in the field and may actually be separated from the cuttings in the first portion of the well drilling operation through non-producing zones.

In difficultly accessible areas where transportation of pipe would be required over long distances, the composition of this invention used as a screen or pipe or casing is of great advantage in eliminating costly construction factors in the well development. The employment of the organic thixotropic material with the enzymic degradation factor is particularly valuable in making the screen composition of this invention of a high degree of utility and advantage in the field. The organic base drilling material eliminates the problem of well-bore damage. Due to the varying viscosity when mixed with water, the enzyme degradable material can be blended to fit the criteria in the field. The deterioration or degradation caused by the enzymic action prevents clogging damage to the well screen or casing. Thus, there has been provided a highly advantageous filter material composition and degradable thioxotropic drilling fluid media and process that can be used in the field in remote areas at a highly reduced cost.

Various changes and modifications may be made within this invention as will be readily apparent to those skilled in the art. Such changes and modifications are within the scope and teaching of this invention and as defined by the claims appended hereto.

What is claimed is:

1. A drilling mud consisting essentially of an aqueous dispersion of an organic gum and an enzyme destructive of said gum, said enzyme being Johnson's Revert.

2. The drilling mud of claim 1 in which the gum is at least one member of the group consisting of guar gum, gum arabic, and mesquite gum.

3. The drilling mud of claim 1 in which the gum is generally a high molecular weight mono, di, or polysaccharide which forms a colloid with water.

4. A method of drilling a well which comprises using a drilling fluid when drilling through the producing zone comprising an aqueous dispersion of an organic gum consisting of essentially high molecular weight mono, di, or polysaccharide which forms a colloid with water, and an enzyme destructive of said gum, and in which method a permeable screen is inserted in the borehole in the producing zone and the drilling fluid is reduced in viscosity by the enzyme.

5. The method of claim 4 in which the screen consists essentially of sand and up to about 4% by weight of an epoxy resin binder.

6. The method of claim 4 in which the drilling fluid consists essentially of at least one member of the group consisting of guar gum, gum arabic, and mesquite gum.

7. The method of claim 4 in which the drilling fluid consists essentially of at least one member of the group consisting of guar gum, gum arabic, and mesquite gum, and the screen consists essentially of sand and about 2% to 4% by weight of an epoxy resin binder.

References Cited

UNITED STATES PATENTS

| | | | |
|---|---|---|---|
| 2,681,704 | 6/1954 | Menaul. | |
| 2,801,407 | 9/1957 | Menual | 252—8.55 |
| 9,854,407 | 9/1958 | Mallory | 252—8.5 |
| 3,146,200 | 8/1964 | Goldstein et al. | 252—8.5 |
| 3,198,268 | 8/1965 | Lindblom et al. | 175—72 |

STEPHEN J. NOVOSAD, Primary Examiner

U.S. Cl. X.R.

252—8.5